Patented Dec. 15, 1953

2,662,864

UNITED STATES PATENT OFFICE 2,662,864

RUBBER COMPOSITIONS WITH OXIDIZED MICROCRYSTALLINE WAX

George G. Rumberger, Neenah, Wis., assignor to Marathon Corporation, Rothschild, Wis., a corporation of Wisconsin No Drawing. Application November 2, 1951,
Serial No. 254,638

8 Claims. (Cl. 260—28.5)

1

This invention relates to materials and processes for the production of rubber compositions capable of being vulcanized at an accelerated rate, and for the production of vulcanizates having added resistance to light cracking and sun checking. The invention relates more particularly to the inclusion in a rubber composition of a wax-like material having a substantial concentration of peroxidic component which may act as an accelerator, vulcanizing agent and sun checking agent without deterioration of the ultimate tensile strength of the composition. Moreover the invention relates to the inclusion in vulcanizable rubber compositions of wax-like materials in a greater percentage than has heretofore been possible without deterioration of the tensile strength of the resulting vulcanized composition.

The deterioration of rubber upon exposure to light, and particularly to sun-light, is well known. This deterioration usually results in the cracking of the rubber surface, conventionally referred to as sun checking, and usually results in a reduction of tensile strength. Whenever these deteriorating effects occur, the rubber may be rendered useless for the purpose intended. It is particularly important where rubber is utilized as a structural element, such as in the side walls of automobile tires, in rubber mountings, rubber footwear, garden hoses, electrical cable coverings, or any other uses wherein the vulcanized rubber may be exposed to the sun-light, that this degradation does not take place. Deterioration due to sun checking results in loss of tensile strength in the rubber with the consequence that the rubber fails as a structureal or protective component.

The initial tensile strength of rubber is a direct function of the vulcanization. The more completely the preparation is vulcanized, i. e., the longer the vulcanization time, the greater the tensile strength of the resulting rubber up to certain limits. For most purposes rubber with a tensile strength of above 2000 pounds per square inch is considered useful. Tensile strength, as pointed out above, is also a criterion of the deterioration of rubber compositions due to aging, particularly in the light.

It is an object of this invention to provide an improved method of making vulcanized rubber having improved sun checking properties and a further object to improve the initial tensile strength of rubber in a reduced vulcanization time. It is yet a further object to provide a vulcanized rubber having an improved resistance to loss of properties upon aging, and particularly sun checking. It is still a further object to provide an improved vulcanization agent having the effect of accelerating the vulcanization processes and increasing the resistance of the resulting rubber to aging and sun checking. Other objects and advantages will be apparent from the following description.

I have found that vulcanizing time can be reduced and that the resulting vulcanized rubber compound can be made more resistant to aging and sun checking by the inclusion therein of a wax-like material containing an appreciable amonut of peroxidic oxygen, that is, oxygen combined with the wax in the form of peroxides or hydroperoxides. I have found that these waxy peroxidic materials can be used effectively with natural rubber, synthetic rubber, and in general all rubber-like materials which are vulcanizable with the aid of sulphur. The hydrocarbon waxes, and even oxidized waxes, have been used previously for the purpose of rendering vulcanized rubber resistant to sun checking. It has been found, however, that when paraffin wax is used the amounts that can be incorporated are limited to one or two per cent. The inclusion of more than this amount of material seriously affects the tensile properties of the rubber, and furthermore, paraffin wax soon crystallizes and blooms to the surface, and is easily scuffed from the rubber surface and thus affords unsatisfactory protection. The inclusion of sufficient amounts of microcrystalline, sometimes termed petroleum wax has resulted in serious impairment of the tensile properties of rubber vulcanizates when sufficient amounts of wax are used to prevent sun checking. Oxidized waxes of various sorts have been proposed for inclusion in rubber compositions. In general these have been materials which have been oxidized to such an extent that an appreciable amount of fatty acids and saponifiable materials result. I have found that the inclusion of waxes or oxidized waxes containing substantial proportions of fatty acids causes a spew or bloom on the surface of the rubber as frosty clumps, and in addition causes a considerable softening of the rubber.

Previous attempts to vulcanize rubber with the aid of periodic materials have in general resulted in vulcanizates which become very brittle upon aging, or are rendered soft and viscous by the action of light and oxygen. Typical of the materials which have been tried for this purpose are benzoyl peroxide, steroyl peroxide, terpene peroxides, and in general peroxides having a low molecular weight. A further undesirable effect of these materials is undue lowering of the plasticity of the compounds during the milling operation, and in some cases this has been so severe as to make the milling and sheeting operation difficult if not impossible.

I have found that a specific type of peroxidic wax is quite effective in preventing sun checking in vulcanized rubber and that the inclusion of this material also increases the rate of vulcanization of compositions to which it is added. More specifically, I have found that peroxidic waxes suitable for my invention may be derived from certain petroleum waxes, for example, microcrystalline waxes. These peroxidic waxes have from about 50 to 550 milliequivalents of peroxide oxygen per kilogram, and a neutralization or acid number not in excess of about 50 milligrams of KOH per gram and a saponification number of less than about 50. My preferred peroxidic waxes have peroxide numbers in the range of from about 100 to about 400 and an acid number not in excess of about 20.

Peroxide number as herein used is determined by the following procedure: One gram of the wax to be tested is dissolved in 25 ml. of pure carbon tetrachloride with the aid of slight heating. A vigorous stream of carbon dioxide is passed through the solution for one minute and then 20 milliliters of acetic acid reagent, consisting of 4 milliliters of concentrated HCl in one liter of glacial acetic acid, is added. The solution is rewarmed to dissolve any precipitating wax. Carbon dioxide is again bubbled through the solution for 1 minute after which 1 ml. of saturated potassium iodide solution is added. Exactly 5 minutes after the addition of the potassium iodide 100 milliliters of distilled water is added, and 5 ml. of starch indicator solution. The flask is shaken for 1 minute. The released iodine is then titrated with .005 normal sodium thiosulphate to the disappearance of the blue color. From this procedure peroxide oxygen is determined as the number of milliequivalents of peroxide oxygen per kilogram of wax which is termed "peroxide number" as follows:

$$\text{Peroxide number} = \frac{\text{ml. of } NaS_2O_3 \times \text{normality} \times 1000}{\text{wt. of wax sample in grams}}$$

Acid number as used herein is determined as follows: 5 grams of the wax to be tested is dissolved in 50 cc. of a mixture of equal parts of technical grade benzol and technical grade isopropyl alcohol. A few drops of phenolphthalein indicator is added and the mixture neutralized with 0.1 normal potassium hydroxide until a slight pink color appears. The acid number is determined from the volume and normality of the potassium hydroxide used, and expressed as the number of milligrams of potassium hydroxide necessary to neutralize the acids in one gram of wax.

For the preparation of the peroxidic wax of my invention I prefer to start with a petroleum wax having a melting point in excess of about 130° F., a molecular weight above about 400, and a refractive index above about 1.4400 at 176° F. The so-called microcrystalline waxes are in this class. I have found that these waxes oxidize quite readily to form substantial concentrations of peroxides without undue developments of fatty acids. In general, the paraffin type petroleum waxes, that is, waxes having a molecular weight below 400, have a tendency to develop fatty acids to excess, and in addition to this the peroxides formed from these materials seem to be relatively unstable, and disappear due to breakdown to other oxygen-containing bodies. On the other hand, peroxides developed from microcrystalline waxes seem to be quite stable, and materials of my inventoin have been stored for a period of as long as a year at normal room temperature without substantial decrease in amount of the peroxide present, and without an increase in the content of fatty acids. I have found products having acid numbers of above 50 undesirable, and prefer products with acid numbers not exceeding 20.

When very dark microcrystalline waxes are used, peroxides do not develop to as great a degree as with relatively light colored bleached material. Furthermore, in the preparation of materials to be used for light colored rubber stock, such as white side wall tire stock, surgical rubber goods, transparent sheeting, and rubber footwear, it is advantageous to have a light colored peroxidic material. For those reasons I prefer to use a bleached microcrystalline wax as a starting material to form my peroxidic wax. Further advantages of the bleached microcrystalline wax are that it is easier to oxidize, and the peroxides formed are more stable.

The petroleum wax may be oxidized by various known methods. I prefer, however, to prepare my peroxidic waxes as follows: I heat a microcrystalline wax to a temperature of from about 200° F. to about 300° F. and blow air through the molten wax for a sufficient time to develop the desired amount of peroxide. I have found that the above temperature range is most favorable for the development of peroxides without excessive development of fatty acids. However, I may heat the wax to a temperature in the range of from about 150° F. to about 350° F. Excessive temperature results in the development of fatty acids at the expense of peroxides, and tends to render the oxidized product dark.

The oxidation step in the preparation of my peroxidic wax may be conducted in stainless steel, ordinary steel, glass, ceramic ware, or any type of vessel which does not have an undesirable catalytic effect on the wax, and which does not contaminate my product with metallic particles or compounds, such as copper, which deteriorate rubber. Pressure may be used if desired without materially limiting the formation of peroxides. Various catalysts may be used, although I prefer to oxidize the wax in the absence of any catalyst other than the peroxidic wax itself. The use of such heavy metals as copper, manganese, cobalt, or mercury in the process or equipment should be avoided. On the other hand, I have found the alkaline earth metals or their oxides, salts, or soaps satisfactory catalysts for my purpose. Aluminum compounds have also proven satisfactory.

If for some reason, peroxides do not develop quickly, it is often advantageous to add some peroxidic wax to an initial starting batch before oxidizing with air or other oxygen-containing gas. In this manner the oxidation may be initiated without a lengthly induction period, and the production of peroxides proceeds quite smoothly.

The peroxide number of my peroxidic wax is limited to about 550 since this is the maximum value that can be developed without undue development of fatty acids. Any attempt to develop peroxides beyond this point results in some of the peroxides decomposing to form an excessive amount of fatty acids, the presence of which is undesirable in my product. This decomposition of peroxides is somewhat less in a process where the petroleum wax is illuminated during the oxidation step with strong light of relatively short wave length. Furthermore, the light has a beneficial effect on the production of peroxides. It is possible to form sufficient peroxides in the wax even at room temperature by the illumination of thin films of wax with strong light having a wave length of from about 2000 to about 4000 Angstrom units.

The following examples illustrate various methods of preparation of peroxidic wax of my invention:

EXAMPLE 1

Approximately 3,000 ml. of melted white microcrystalline wax having a melting point of 146° F., a molecular weight of approximately 600, and a refractive index of 1.4480 at 80° C. was placed in a 5 liter glass flask. This was heated to 250° F. and air was bubbled through until the wax reached a peroxide number of approximately 150 and an acid number of about 3.5. At that point one-half of the wax was removed and designated sample A. The remaining one-half in the flask was additionally heated and air bubbled through until a peroxide number of 330 and an acid number of about 10 were reached. This wax was removed and was designated as sample B.

EXAMPLE 2

A white microcrystalline wax produced by Bareco Oil Company and designated as "170/75 white B-square wax" having a molecular weight of about 800 was placed in a glass vessel at 260° F., and oxygen was bubbled through at a rate of 10 ml. per second for 7 hours. After this treatment the wax was removed and was found to have a peroxide number of 66 and an acid number of 0.23.

EXAMPLE 3

Cream colored microcrystalline wax having a melting point of 146° F., a molecular weight of approximately 600 and a refractive index of 1.4480 was placed in a flask at 260° F. and oxygen bubbled through for 7 hours. This treatment was carried out in the presence of approximately 3½ grams of aluminum foil per 100 grams of wax. At the end of 7 hours the peroxide number of this wax was 51 and the acid number was 0.35.

EXAMPLE 4

White microcrystalline wax having a melting point of 145° F. to 147° F. was heated in a glass vessel to 220° F. and air was bubbled through for 96 hours. At the end of this time the wax had a peroxide number of 498 and an acid number of about 3.

I have found that the most desirable amount of my peroxidic wax to add to a given rubber composition will vary somewhat with the nature of the rubber base stock. With vulcanizable materials such as natural rubber, I find that the best results are obtained when there is present in the unvulcanized mixture from about 0.2 to about 1.0 milliequivalents of peroxide-oxygen per 100 grams of rubber. I have found that compositions containing about 0.5 milliequivalent of peroxide-oxygen per 100 grams of rubber are the most satisfactory. Compositions containing 3 parts of peroxidic wax, having a peroxide number approximately 150 per 100 parts of natural rubber were quite satisfactory. With more difficultly vulcanizable materials such as the butadiene copolymers, exemplified by Buna-S, Hycar, Perbunan, and like polymers, greater amounts of peroxides are required. I find that with these synthetic rubbers quantities of peroxide-oxygen up to 5 milliequivalents per 100 grams of rubber are required. For example, Buna-S required as high as 5 milliequivalents of peroxide-oxygen per 100 grams, although beneficial results were obtained with as little as .5 milliequivalent. I find that a Buna-S composition, containing 10 parts of peroxidic wax having a peroxide number of about 350, has after vulcanization very good tensile strength and resists aging in the presence of light in a stretched condition. In general, I prefer to add from 1 to 10 parts of peroxidic wax to each 100 parts of rubber.

In addition to the peroxidic wax of my invention other processing aids ordinarily used in the preparation of vulcanizable rubber compositions can be included. Vulcanization initiators, such as zinc oxide, are beneficial, although the amount necessary in the presence of higher quantities of peroxidic wax is less than in compositions having no peroxidic wax. Also the amount of sulphur necessary to thoroughly vulcanize compositions may be somewhat less with the inclusion of my peroxidic wax, apparently due to the fact that the accelerating value of my material results in more beneficial utilization of the sulfur. Other accelerators, such as mercaptobenzothiazole or benzothiazyl disulfide, can be used, but in general the amount required is less than with compositions having no peroxidic wax. Contrary to the effect ordinarily observed, that waxy materials retard vulcanization, inclusion of my peroxidic waxes results in increased vulcanization rate and increased tensile strength of the vulcanizate both before and after aging. In addition to the foregoing rubber processing chemicals, processing agents, such as petroleum oils and resins, petroleum sulphonates, stearic acid, asphaltic fluxes, tackifiers, and fillers and reinforcing agents, such as carbon black, titanium dioxide, calcium sulphate, calcium carbonate, and lignins may be added to the composition.

The following examples will serve to illustrate specific vulcanized rubber compositions of my invention of both natural and synthetic rubber:

EXAMPLE 5

100 parts of GRS stock, a butadiene-styrene polymer, was warmed on a rubber mill and to this was added 10 parts of peroxidic wax having a peroxide value of 370 and an acid value of 3.0. The following additional ingredients were then worked in on the rubber mill: zinc oxide 6 parts, stearic acid 1 part, sulphur 1.5 parts, Altax (benzothiazyl disulphide) 2.0 parts, Tuads (tetramethyl-thiuram disulphide) 0.20 part, Santoflex B (condensation product of acetone and para-amido-diphenyl) 1.0 part, carbon black 50 parts. After vulcanization strips of the vulcanizate were aged in an oven for 24 hours at 100° C. A similar preparation was made in which all of the ingredients were added with the exception of the oxidized microcrystalline wax. Samples of this also were oven-aged for 24 hours at 100° C.

When samples of the above compositions, both unheated and heated in the oven, were formed over a ½-inch wooden ferrule and exposed to north light for three months, it was found that the samples containing oxidized microcrystalline wax showed no sun checking, whereas the samples containing no oxidized microcrystalline waxes showed very pronounced cracking almost to the point of complete failure.

EXAMPLE 6

Natural rubber side wall compositions were prepared by blending 100 parts of natural rubber smoked sheet on a rubber mill and given a few passes to warm the stock. 45 parts of carbon black were then added and allowed to work in thoroughly for 10 minutes. Three parts of zinc oxide were then added and again allowed to work in thoroughly for 2 minutes. The rubber, so compounded, was then divided into three batches. To each of these were added processing aids consisting of 2 parts of Reogen, 1 part of Paraflux, 3 parts of stearic acid, then batch A had no wax, batch B had 3 parts microcrystalline wax, and batch C had 3 parts of the peroxidic wax A of Example 1. These ingredients were allowed to work in. Finally the accelerators consisting of .6 part mercaptobenzothiazole and .3 part of benzothiozyl disulphide, and 2.75 parts of sulphur were added to each batch and worked in. The three completely compounded stocks were then worked on the mill for an additional 5 minutes and finally sheeted off into slabs 0.075 inch thick. The total milling time for these batches was 25 minutes each.

*Natural rubber compounds*

| | A | B | C |
|---|---|---|---|
| Smoked sheet rubber | 100 | 100 | 100 |
| Reogen (Sulphonated oil) | 2 | 2 | 2 |
| Stearic acid | 3 | 3 | 3 |
| Paraflux (hydrocarbon plasticizer) | 1 | 1 | 1 |
| Zinc oxide | 3 | 3 | 3 |
| Carbon black | 45 | 45 | 45 |
| Sulfur | 2.75 | 2.75 | 2.75 |
| Captax (mercaptobenzothiazole) | 0.6 | 0.6 | 0.6 |
| Altax (benzothiazyl disulfide) | 0.3 | 0.3 | 0.3 |
| Microcrystalline wax 0.0 peroxide number | | 3.0 | |
| Microcrystalline wax 150 peroxide number (Sample A, Example 1) | | | 3.0 |

Each of the above preparations A, B, and C was vulcanized for 25, 50 and 75 minutes at 274° F. Representative samples of each composition at each cure were exposed in a stretched condition to south light according to ASTM, T-D518-44 part B. After exposure for 110 days the tensile strength was determined, and the results compared with original samples which has been stored in the dark at 50% relative humidity and 70° F. also for 110 days. Table I gives the results of these tests.

Table I.—*Tensile strength of rubber compositions aged in darkness and light*

| Composition | Type of wax | Time of cure vs. Tensile strength (lbs. per sq. in.) | | | | | |
|---|---|---|---|---|---|---|---|
| | | 25 minutes aged in — | | 50 minutes aged in — | | 75 minutes aged in — | |
| | | Dark | Light | Dark | Light | Dark | Light |
| A | None | 2,261 | 270 | 3,285 | 1,750 | 3,400 | 1,475 |
| B | Microcrystalline | 2,291 | 599 | 3,110 | 2,400 | 3,300 | 2,750 |
| C | Oxidized microcrystalline | 2,690 | 1,125 | 3,490 | 2,950 | 3,385 | 2,880 |

The results in Table I show the effect of my peroxidic wax on the rate of vulcanization. Sample C containing the oxidized wax is vulcanized to its maximum strength in 50 minutes, whereas compositions without any wax or with unoxidized microcrystalline wax require 75 minutes for vulcanization. It is also apparent that the tensile strength, after exposure to light, is greater for compositions containing the peroxidic wax than for compositions containing unoxidized wax or no wax.

EXAMPLE 7

Compositions were made up with GRS rubber using the processing methods of Example 6 except that the total milling time was 30 minutes. The GRS compositions were then cured at a temperature of 300° F. for periods of 20, 40, and 60 minutes. These compositions were as follows:

*Composition of GRS preparations in parts*

| | D | E | F | G |
|---|---|---|---|---|
| GRS rubber (butadiene-styrene) | 100.0 | 100.0 | 100.0 | 100.0 |
| Reogen (sulfonated oil) | 4.0 | 4.0 | 4.0 | 4.0 |
| Stearic acid | 1.0 | 1.0 | 1.0 | 1.0 |
| Paraflux (hydrocarbon plasticizer) | 3.0 | 3.0 | 3.0 | 3.0 |
| Zinc oxide | 5.0 | 5.0 | 5.0 | 5.0 |
| Carbon black | 45.0 | 45.0 | 45.0 | 45.0 |
| Sulfur | 1.7 | 1.7 | 1.7 | 1.7 |
| Altax (benzothiazyl disulfide) | 1.2 | 1.2 | 1.2 | 1.2 |
| Zimate (zince dialklyl dithio carbamate) | 0.15 | 0.15 | 0.15 | 0.15 |
| 145-47° F. MP microcrystalline wax 0 Perixoide No | 3.0 | 10 | | |
| 145-47° F. MP microcrystalline wax 150 Peroxide No. (Example 1, Sample A) | | | 3.0 | |
| 145-47° F. MP microcrystalline wax 330 Peroxide No. (Example 1, Sample B) | | | | 10 |

After vulcanization the foregoing compositions were exposed in a stretched condition to south light for 110 days in the same manner as in Example 6. After exposure for this time the tensile strength of each sample was compared with that of similar samples stored in the dark. Table II following shows the results of this test:

Table II.—*Tensile strength of rubber compositions aged in darkness and light*

| Composition | Parts wax | Peroxide No. | Time of cure vs. Tensile strength GRS rubber (lbs. per sq. in.) | | | | | |
|---|---|---|---|---|---|---|---|---|
| | | | 20 minutes aged in— | | 40 minutes aged in— | | 60 minutes aged in— | |
| | | | Dark | Light | Dark | Light | Dark | Light |
| D | 3 | 0 | 452 | 460 | 1,874 | 1,050 | 2,380 | 1,150 |
| E | 10 | 0 | 364 | 500 | 1,980 | 1,900 | 2,280 | 1,880 |
| F | 3 | 150 | 417 | 530 | 2,355 | 1,900 | 2,830 | 1,970 |
| G | 10 | 330 | 917 | 1,120 | 2,410 | 2,300 | 2,296 | 2,300 |

At 20 minute cure, increasing the unoxidized wax from 3 to 10 parts in the composition resulted in a decrease of tensile strength when the composition was kept in the dark, whereas increasing the oxidized wax and its peroxidic value resulted in an increase of tensile strength. It is also notable that composition G cured for 20 minutes, increased in tensile strength on exposure to light to a value approximately double those of compositions B, E, and F. A comparsion of compositions aged in the light show that for equal amount of wax added to the rubber, compositions containing peroxidic waxes always give a higher tensile strength after aging. Also, the compositions containing my peroxidic waxes develop a tensile strength over 2000 in 40 minutes curing time, whereas compositions containing ordinary wax require 60 minutes.

To illustrate further the beneficial results of the peroxidic waxes in preventing sun checking, the following example is typical:

EXAMPLE 8

GRS compositions were made up as in Example 7 with different amounts of peroxidic wax (from Example 1), except that the compositions were cured for 60 minutes only. After curing, samples were exposed to south light (according to ASTM T-D518-44 part B) and the time noted for sun checking to appear. The test was terminated at the end of 110 days. Table III shows the results obtained in this test:

Table III

| Wax used (percent based on rubber) | Time required for checking (days) | | |
| --- | --- | --- | --- |
| | Slight | Moderate | Bad |
| 1% unoxidized | 4 | 13 | 63. |
| 1% 150 Peroxide No. (Example 1, Sample A). | 5 | 32 | 63. |
| 1% 330 Peroxide No. (Example 1, Sample B). | 4 | 32 | 63. |
| 3% unoxidized | 5 | 10 | 17. |
| 3% 150 Peroxide No. (Example 1, Sample A). | 10 | Over 110 | |
| 3% 330 Peroxide No. (Example 1, Sample B). | 24 | do | |
| 5% unoxidized | 13 | 14 | Over 110. |
| 5% 150 Peroxide No. (Example 1, Sample A). | 14 | Over 110 | |
| 5% 330 Peroxide No. (Example 1, Sample B). | 14 | do | |

Results of Table III show that the addition of my peroxidic waxes prevent sun checking for a greater period of time than ordinary oxidized waxes, and thus results in greater permanency of the already improved tensile strength of the rubber compositions, as previously shown.

As noted before it has been generally considered that the presence of peroxidic materials in rubber compositions is detrimental to the quality thereof. The results I have obtained by the addition of peroxidic wax are, therefore, quite unexpected. Since the peroxidic materials accelerate the rate of vulcanization their action may be catalytic. This is evidenced by the fact that most of the cured compositions containing peroxidic wax show higher tensile strength than those containing no wax, or unoxidized wax. It has been noted that when peroxidic waxes of over 400 molecular weight are present, the amount of accelerator, and also the amount of sulphur, can often be reduced and vulcanization still effected during a normal vulcanization period. The fact that initial tensile strength does not seriously decrease when quantities of peroxidic wax in excess of one or two per cent are used, indicates that it is possible the waxes actually enter into the vulcanization process, and are molecularly bound to the rubber polymer. I have been able to find no evidence of residual peroxide in the rubber composition after vulcanization, and it is possible that sulphur may in some way replace the oxygen in the peroxidic wax.

In addition to its use with vulcanizable rubber compositions, my peroxidic wax materials may be used as initiators and accelerators of other polymerization reactions. For example, in the polymerization of ethylene at high temperatures and pressures peroxidic waxes may be used as initiators or polymerization in place of oxygen or other peroxides. Also in the production of high molecular weight alcohols from ethylene and an isomeric alcohol, such as isopropyl alcohol, wax peroxides may be used in place of hydrogen peroxide, sodium peroxide, oxygen, ozone, and other compounds containing active oxygen. By direct hydrogenation of the peroxidic wax, high molecular weight alcohols and esters may be produced. The peroxidic waxes may also be used to destroy phenolic type oxidation inhibitors, if it is desirable to remove these from a reaction zone.

Having described the significant features of my invention and a number of specific embodiments of same, it is to be understood that modifications and changes may be made within the teachings of the present disclosure which are intended to be included within the scope of the appended claims.

I claim:

1. An improved synthetic rubber comprising a butadiene polymer and about 1% to about 10%, based on the weight of the rubber, of oxidized microcrystalline wax having a peroxide number in the range of about 150 to about 330 and an acid number less than about 50.

2. A method for improving sun checking of rubber which comprises incorporating an oxidized microcrystalline wax into a rubber composition, said oxidized wax having a peroxide number in the range of about 100 to about 400 and an acid number not in excess of about 20 and vulcanizing the composition.

3. A vulcanizable rubber composition comprising rubber and oxidized microcrystalline wax in amount of about 1 part to about 10 parts per 100 parts of rubber, said wax having a peroxide number in the range of about 100 to about 400 and an acid number not in excess of about 20.

4. A vulcanizable rubber composition comprising rubber and oxidized microcrystalline wax in an amount of about 1 part to about 10 parts per 100 parts of rubber and having a peroxide number in the range of about 150 to about 350 and an acid number not in excess of about 20.

5. A method for improving sun checking of rubber which comprises incorporating into a rubber composition oxidized microcrystalline wax having a peroxide number in the range of about 50 to about 550 and an acid number not in excess of about 50 and vulcanizing the composition.

6. A vulcanizable rubber composition comprising rubber and oxidized microcrystalline wax in an amount of about 1 part to about 10 parts per 100 parts of rubber and having a peroxide number in the range of about 50 to about 550 and an acid number not in excess of about 50.

7. An improved vulcanizable natural rubber composition containing about 0.2 to about 1.0 milliequivalents of peroxide oxygen per 100 grams of rubber, said peroxide oxygen being present in the form of an oxidized microcrystalline wax having a peroxide number of from about 50 to 550 and an acid number less than about 50 and molecular weight greater than 400.

8. An improved vulcanizable synthetic rubber composition containing about 0.5 to about 5.0 milliequivalents of peroxide oxygen per 100 grams of rubber, said peroxide oxygen being present in the form of an oxidized microcrystalline wax with a peroxide number of about 50 to 550 and an acid number less than about 50 and molecular weight greater than 400.

GEORGE G. RUMBERGER.

References Cited in the file of this patent

UNITED STATES PATENTS

| Number | Name | Date |
|---|---|---|
| 1,926,424 | Beck | Sept. 12, 1933 |
| 2,186,909 | Pollack | Jan. 9, 1940 |
| 2,471,102 | Fish | May 24, 1949 |
| 2,595,911 | Young | May 6, 1952 |